US012723222B2

(12) United States Patent
Si et al.

(10) Patent No.: US 12,723,222 B2
(45) **Date of Patent: *Sep. 1, 2026**

(54) DETERGENT COMPOSITION COMPRISING A POLYMER

(71) Applicant: The Procter & Gamble Company, Cincinnati, OH (US)

(72) Inventors: Gang Si, Newcastle upon Tyne (GB); Michael Mcdonnell, Blyth (GB); Martijn Gillissen, Frankfurt am Main (DE); Hiroe Yamada, Frankfurt am Main (DE)

(73) Assignee: The Procter & Gamble Company, Cincinnati, OH (US)

( * ) Notice: Subject to any disclaimer, the term of this patent is extended or adjusted under 35 U.S.C. 154(b) by 547 days.

This patent is subject to a terminal disclaimer.

(21) Appl. No.: 17/106,228

(22) Filed: Nov. 30, 2020

(65) Prior Publication Data

US 2021/0171874 A1 Jun. 10, 2021

(30) Foreign Application Priority Data

Dec. 9, 2019 (EP) .................................... 19214566

(51) Int. Cl.

| | |
|---|---|
| ***C11D 3/37*** | (2006.01) |
| ***C11D 1/86*** | (2006.01) |
| ***C11D 3/00*** | (2006.01) |
| ***C11D 11/00*** | (2006.01) |

(52) U.S. Cl.

CPC .............. *C11D 3/3715* (2013.01); *C11D 1/86* (2013.01); *C11D 3/0068* (2013.01); *C11D 3/3707* (2013.01); *C11D 2111/12* (2024.01)

(58) Field of Classification Search

CPC ....... C11D 3/3715; C11D 1/86; C11D 3/0068; C11D 3/3707; C11D 11/0017; C11D 3/37; C11D 3/3723; C11D 3/378; C11D 3/3792; C11D 3/43; C11D 3/0036; C08G 63/183; C08G 63/672; C08G 63/6856

See application file for complete search history.

(56) References Cited

U.S. PATENT DOCUMENTS

| | | | | |
|---|---|---|---|---|
| 4,760,100 A * | 7/1988 | McDaniel | C08G 18/4247 | 521/157 |
| 4,956,447 A | 9/1990 | Gosselink | | |
| 5,462,681 A * | 10/1995 | Gutzmann | C10M 133/06 | 508/513 |
| 5,728,671 A * | 3/1998 | Rohrbaugh | C11D 3/3715 | 510/528 |
| 7,119,056 B2 * | 10/2006 | Koch | C11D 3/3715 | 510/109 |
| 2015/0218491 A1 * | 8/2015 | Morschhaeuser | C08G 63/672 | 510/400 |
| 2017/0321154 A1 * | 11/2017 | Cohrs | C11D 11/0017 | |
| 2023/0012337 A1 * | 1/2023 | Gillissen | C08G 63/6886 | |

FOREIGN PATENT DOCUMENTS

| | | | | |
|---|---|---|---|---|
| CA | 1210009 A * | 8/1986 | C08G 65/04 |
| CA | 2801643 A1 * | 1/2012 | B01F 17/0042 |
| EP | 3118241 A1 * | 1/2017 | |
| WO | WO-9217523 A1 * | 10/1992 | C08G 63/66 |
| WO | 9815607 A2 | 4/1998 | |
| WO | 2007059532 A1 | 5/2007 | |
| WO | 2016195834 A1 | 12/2016 | |
| WO | 2019224030 A1 | 11/2019 | |
| WO | 2021116049 A1 | 6/2021 | |

OTHER PUBLICATIONS

MARLIPAL msds. (Year: 2022).*
Google Patents translation of CA1210009A, https://patents.google.com/patent/CA1210009A/en?oq=CA1210009A (Year: 1986).*
PCT Search Report and Written Opinion for PCT/US2020/062538 dated Mar. 12, 2021, 16 pages.
Extended European Search Report and Search Opinion; Application Ser_ No. 19214566.2; dated Jun. 9, 2020; 6 pages.

* cited by examiner

*Primary Examiner* — Angela C Brown-Pettigrew
*Assistant Examiner* — Preeti Kumar
(74) *Attorney, Agent, or Firm* — Abigail O. Idokogi; Andrew J. Mueller; George H. Leal

(57) ABSTRACT

A detergent composition can include a detersive surfactant and a specific polymer wherein the composition can be a fabric treatment product.

18 Claims, No Drawings

DETERGENT COMPOSITION COMPRISING A POLYMER

FIELD OF THE INVENTION

The present invention relates to detergent composition comprising detersive surfactant and a polymer. The compositions are particularly suitable for use in fabric treatment applications, such as laundry applications. The compositions can be used as fabric treatment products, such as laundry detergent products. The compositions exhibit improved freshness performance, and especially good anti-malodor performance.

BACKGROUND OF THE INVENTION

Consumers use laundry compositions during the laundry process. Such laundry compositions provide cleaning, freshness and/or care benefits to the fabrics during the laundry operation. Recently, a developing need for laundry composition is ensuring that malodors on fabrics are reduced to a minimum during the laundry process. Malodor is also a growing problem in other consumer product areas. For example, dish washers may generate malodor when consumer washing habit changed to lower temperatures and shorter wash cycles. Also, for example, malodor generated on implements (such as sponges) become a problem for consumers who use an implement in their manual dish washing.

Malodors are typically caused by adherence of soils, especially hydrophobic soils such as body soils, cooking oils, and non-food oils onto the surface, such as fabrics, and especially onto hydrophobic fabrics.

The present invention addresses the above problems by providing a detergent composition that exhibits improved freshness performance, and especially good anti-malodor performance. The detergent compositions also reduce the adhesion of soil to surfaces (soil release); reduce the adhesion of biological stains or microorganisms to textiles, and promote the repellency of allergens from a surface.

SUMMARY OF THE INVENTION

The present invention relates to a detergent composition comprising detersive surfactant and a polymer, wherein the polymer comprises:

(a) one or more structure unit (I),
(b) one or more structure unit (II),
(c) one or more structure unit selected from (III-a), (III-b), (III-c), or combination thereof, wherein the structure units are:

(I)

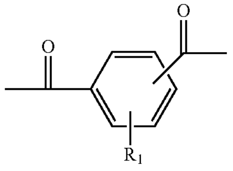

(II)

$$—O—R_2—O—$$

(III-a)

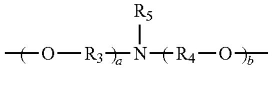

-continued (III-b)

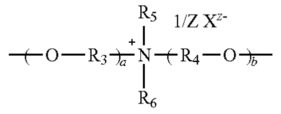

(III-c)

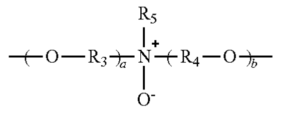

wherein:

$R_1$ is H or $SO_3M$, in which M is a counter ion;

$R_2$ is one or more linear or branched alkylene group represented by formula $(C_mH_{2m})$, wherein m is an integer from 2 to 10, preferably from 2 to 6, and more preferably is 2, 3, 4 or 6;

$R_3$ and $R_4$ are independently selected from a linear or branched alkylene group represented by formula $(C_nH_{2n})$, wherein n is 2, 3 or 4;

$R_5$ is selected from the group consisting of $—(C_jH_{2j}O)_k—R_{98}$, wherein k is, based on a molar average, a number selected from 0 to 10, preferably from 0 to 5, and more preferably is 0, j is 2, 3 or 4, $R_{98}$ is selected from alkyl, alkenyl, hydroxyalkyl, hydroxyalkenyl, alkyl phenyl, alkenyl phenyl, phenyl alkyl and phenyl alkenyl, wherein the alkyl and alkenyl groups comprise at least 6 carbon atoms, preferably from 6 to 30 carbon atoms, and more preferably from 6 to 22 carbon atoms, $R_6$ is selected from the group consisting of $—(C_jH_{2j}O)_k—R_{99}$, wherein k is, based on molar average, a number of from 0 to 10, preferably from 0 to 5, and more preferably is 0, j is 2, 3 or 4, $R_{99}$ is selected from hydrogen, alkyl, alkenyl, hydroxyalkyl, hydroxyalkenyl, alkyl phenyl, alkenyl phenyl, phenyl alkyl and phenyl alkenyl, a and b are from 1 to 200, based on molar average and independently selected from one another.

DETAILED DESCRIPTION OF THE INVENTION

The detergent composition. The composition comprises a specific polymer. The polymer is defined in more detail below. The composition comprises detersive surfactant. The detersive surfactant is described in more detail below.

The composition may be used for treating a fabric surface. The composition may be used to reduce the adhesion of soil to a fabric surface. The composition may be used to reduce the adhesion of biological stains or microorganisms to textiles. The composition may be used for promoting the repellency of allergens from a surface. The composition may be used for the control of malodor.

The composition can be in the form of a liquid, a gel, a powder, a hydrocolloid, an aqueous solution, a granule, a tablet, a capsule, a single compartment sachet, a multi-compartment sachet, a single compartment pouch, or a multi-compartment pouch. The product may preferably be in the form of a liquid, a gel, a powder, a single compartment sachet, or a multi-compartment sachet.

Preferably, the composition is a fabric care product. A fabric care product can be used for hand wash, machine wash and/or other purposes such as soaking and/or pretreatment of fabrics, for example. A fabric care product may take the form of, for example, a laundry detergent; fabric conditioner; any wash-, rinse-, or dryer-added product; unit dose or spray. Fabric care products in a liquid form may be in the form of an aqueous composition. A fabric care product can be in a dry form such as a granular detergent or dryer-added fabric softener sheet. Other non-limiting examples of fabric care products can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists; water-soluble unit dose articles.

The composition may be optionally diluted with water, or a solution predominantly comprised of water, to produce an aqueous mixture for the target application.

The composition can be in any useful form, for example, as powders, granules, pastes, bars, unit dose, or liquid.

The unit dose form may be water-soluble, for example, a water-soluble unit dose article comprising a water-soluble film and a liquid or solid laundry detergent composition, also referred to as a pouch. A water-soluble unit dose pouch comprises a water-soluble film which fully encloses the liquid or solid detergent composition in at least one compartment. The water-soluble unit dose article may comprise a single compartment or multiple compartments. The water-soluble unit dose article may comprise at least two compartments or at least three compartments. The compartments may be arranged in a superposed orientation or in a side-by-side orientation.

A unit dose article is typically a closed structure, made of the water-soluble film enclosing an internal volume which comprises the liquid or solid laundry detergent composition. The pouch can be of any form and shape which is suitable to hold and protect the composition, e.g. without allowing the release of the composition from the pouch prior to contact of the pouch to water.

A liquid detergent composition may be aqueous, typically containing up to about 70% by weight of water and 0% to about 30% by weight of organic solvent. It may also be in the form of a compact gel type containing less than or equal to 30% by weight water.

The composition typically comprises other ingredients. These ingredients are described in more detail below.

The polymer. The polymer comprises:

(a) one or more structure unit (I), (b) one or more structure unit (II), (c) one or more structure unit selected from (III-a), (III-b), (III-c), or combination thereof, wherein the structure units are:

(I)

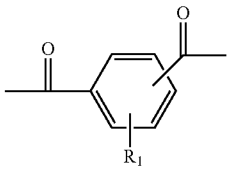

(II)

$$—O—R_2—O—$$

-continued (III-a)

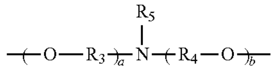

(III-b)

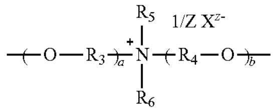

(III-c)

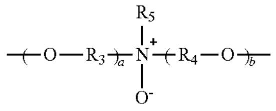

wherein:

$R_1$ is H or $SO_3M$, in which M is a counter ion;

$R_2$ is one or more linear or branched alkylene group represented by formula $(C_mH_{2m})$, wherein m is an integer from 2 to 10, preferably from 2 to 6, and more preferably is 2, 3, 4 or 6;

$R_3$ and $R_4$ are independently selected from a linear or branched alkylene group represented by formula $(C_nH_{2n})$, wherein n is 2, 3 or 4;

$R_5$ is selected from the group consisting of $—(C_jH_{2j}O)_k—R_{98}$, wherein k is, based on molar average, a number from 0 to 10, preferably from 0 to 5, and more preferably is 0, j is 2, 3 or 4, $R_{98}$ is selected from alkyl, alkenyl, hydroxyalkyl, hydroxyalkenyl, alkyl phenyl, alkenyl phenyl, phenyl alkyl and phenyl alkenyl, wherein the alkyl and alkenyl groups comprise at least 6 carbon atoms, preferably from 6 to 30 carbon atoms and more preferably from 6 to 22 carbon atoms, $R_6$ is selected from the group consisting of $—(C_jH_{2j}O)_k—R_{99}$, wherein k is, based on molar average, a number from 0 to 10, preferably from 0 to 5, and preferably is 0, j is an integer selected from 2, 3 or 4, $R_{99}$ is selected from hydrogen, alkyl, alkenyl, hydroxyalkyl, hydroxyalkenyl, alkyl phenyl, alkenyl phenyl, phenyl alkyl and phenyl alkenyl, a and b are from 1 to 200, based on molar average, and independently selected from one another.

The polymer may further comprise one or more terminal group (IV) derived from polyalkylene glycolmonoalkylethers, preferably selected from structure (IV-a)

$$—O—[C_2H_4—O]_c—[C_3H_6—O]_d—[C_4H_8—O]_e—R_7 \quad \text{(IV-a)}$$

wherein:

$R_7$ is a linear or branched $C_{1-30}$ alkyl, preferably $C_{1-4}$ alkyl, more preferably methyl; and c, d and e are, based on molar average, a number independently selected from 0 to 200, where the sum of c+d+e is from 2 to 500, wherein the $[C_2H_4—O]$, $[C_3H_6—O]$ and $[C_4H_8—O]$ groups of the terminal group (IV-a) may be arranged blockwise, alternating, periodically and/or statistically, preferably blockwise and/or statistically, either of the $[C_2H_4—O]$, $[C_3H_6—O]$ and $[C_4H_8—O]$ groups of the terminal group (IV-a) can be linked to —R7 and —O.

The polymer may further comprise a polyalkyleneglycol derived structure unit (V), preferably a polyalkyleneglycol derived structure unit (V-a)

$$—O—[C_2H_4—O]_f— \quad (V\text{-}a)$$

wherein f is, based on a molar average, from 2 to 500.

Structure Unit (I):

$R_1$ may preferably be $SO_3M$, in which M is a mono-, divalent or multi-valent cation selected from $Li^+$, $Na^+$, $K^+$, $Mg^+$, $Ca^{2+}$, $Al^{3+}$, $NH_4^+$, a monoalkylammonium ion, dialkylammonium ion, trialkylammonium ion and/or tetraalkylammonium ion, where the alkyl substituents of the ammonium ions are, independently of one another, $(C_1\text{-}C_{22})$-alkyl radicals or $(C_2\text{-}C_{10})$-hydroxyalkyl radicals.

$R_1$ may more preferably be H.

Structure unit (I) of the polymer are derived from aromatic diacids or their salts or their dialkylesters, such as, terephthalic acid, phthalic acid, isophthalic acid, 5-sulfoisophthalic acid, 3-sulfophthtalic acid, 4-sulfophthtalic acid or their salts or their dialkyl esters, preferably their (C1-C4)-dialkyl esters and more preferably their dimethyl esters, or mixtures thereof. Preferably, the number of structure units (I) in the polymer is, on a molar average, from 2 to 30, preferably from 3 to 22, and more preferably from 3 to 12 per polymer molecule.

In addition to structure units (I), further structure units derived from other di- or polycarboxylic acids or their salts or their (di)alkylesters can be used in the polymer, such as, naphthalene-1,4-dicarboxylic acid, naphthalene-2,6-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their (C1-C4)-(di)alkyl esters and more preferably their (di)methyl esters, or mixtures thereof. Typically, such further structure units derived from other di- or polycarboxylic acids or their salts or their (di)alkylesters would be present to a minor extent, for example in an amount smaller than 5 wt.-%, based on the total weight of the polymer.

Structure Units (II):

Structure units (II) of the polymer are derived from glycols, such as ethyleneglycol, 1,2-propyleneglycol, 1,3-propyleneglycol, 2-methyl-1,3-propanediol, 1,4-butanediol, 1,3-butanediol, 2,3-butanediol, 1,2-butanediol, 2,2-dimethyl-1,3-propanediol, 1,2-pentanediol, 1,5-pentanediol, 1,2-hexanediol, 1,6-hexanediol or mixtures thereof. Preferably, $R_2$ is selected from the group consisting of $(C_2H_4)$ and $(C_3H_6)$ and more preferably is $(C_3H_6)$.

In the case that one molecule of the polymer comprises two or more of the structure units (II), the definition of $R_2$ may vary between those structure units.

Structure Unit (III-a), (III-b), (III-c):

Structure unit (III-a), (III-b), and (III-c) of the polymer are derived from amine alkoxylates.

$R_3$ and $R_4$ are selected from the group consisting of $(C_2H_4)$, $(C_3H_6)$, $(C_4H_8)$ or combination thereof preferably $R_3$ and $R_4$ are $(C_2H_4)$.

a and b are, based on a molar average, independently of one another, numbers from 1 to 200, preferably from 1 to 100, more preferably from 1 to 50, even more preferably from 1 to 25, and particularly preferably from 1 to 10.

$R_5$ in is selected from the group consisting of $—(C_jH_{2j}O)_k—R_{98}$, wherein k is, based on molar average, from 0 to 10, preferably from 0 to 5, and more preferably from 0 to 2, and most preferably is 0.

j is 2, 3 or 4, preferable 2.

$R_{98}$ is selected from alkyl, alkenyl, hydroxyalkyl, hydroxyalkenyl, alkyl phenyl, alkenyl phenyl, phenyl alkyl and phenyl alkenyl, wherein the alkyl and alkenyl groups comprise at least 6 carbon atoms, preferably from 6 to 30 carbon atoms and more preferably from 6 to 22 carbon atoms.

Example of $R_{98}$ including linear, branched or cyclic hexyl, heptyl, octyl (e.g. capryl), nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetraicosyl, pentaicosyl, hexaicosyl, heptaicosyl, octaicosyl, nonaicosyl, triacontyl.

Example of $R_{98}$ also including linear, branched or cyclic hexenyl, heptenyl, octenyl, nonenyl, decenyl, dodecenyl, tetradecenyl, hexadecenyl, octadecenyl, octadecadienyl, octadecatrienyl, eicosenyl, eicosadienyl, eicosatetraenyl, docosenyl, docosahexaenyl, tetracosenyl, or mixtures thereof.

Example of $R_{98}$ also including hydroxy hexyl, hydroxy heptyl, hydroxy octyl, hydroxy nonyl, hydroxy decyl, hydroxy undecyl, hydroxy dodecyl, hydroxy docosyl, or mixtures thereof, Examples of $R_{98}$ also including phenyl hexyl, phenyl heptyl, phenyl octyl, phenyl nonyl, phenyl decyl, phenyl undecyl, phenyl dodecyl, or mixtures thereof.

Examples of $R_{98}$ also hexyl phenyl, heptyl phenyl, octyl phenyl, nonyl phenyl, decyl phenyl, undecyl phenyl, dodecyl phenyl, or mixtures thereof.

The alkyl groups mentioned in the definition of the groups R98 and R99, either as such or as a part of the hydroxyalkyl, phenyl alkyl or alkyl phenyl groups, may be linear, branched or cyclic. Preferably, these alkyl groups are linear.

The alkenyl groups mentioned in the definition of the groups R98 and R99, either as such or as a part of the hydroxyalkenyl, phenyl alkenyl or alkenyl phenyl groups, may comprise one or more double bonds and may be linear, branched or cyclic. Preferably, these alkenyl groups are linear.

$R_6$ is selected from the group consisting of $—(C_jH_{2j}O)_k—R_{99}$, wherein k is, based on molar average, selected from 0 to 10, preferably from 0 to 5, and more preferably from 0 to 2, and most preferably is 0.

j is 2, 3 or 4, preferable 2.

$R_{99}$ is selected from hydrogen, alkyl, alkenyl, hydroxyalkyl, hydroxyalkenyl, alkyl phenyl, alkenyl phenyl, phenyl alkyl and phenyl alkenyl. Any chain length can be used in the alkyl, alkenyl moieties, preferably with chain length from $C_1$ to $C_{24}$.

In some embodiment, the structure units of formulae (III-a), (III-b), and/or (III-c) may have stereoisomers. For example, when all groups bonded to the nitrogen atom contained in these structure units are different, or when the nitrogen atom contained in these structure units is restricted in rotation and cannot interconvert. The structure units of the formulae (III-a), (III-b), and (III-c) are intended to cover all possible stereoisomers.

Examples of the alkyl and alkenyl groups $R_5$ in the one or more structure units of the formula (III-a) and/or the one or more structure units of the formula (III-b) and/or the one or more structure units of the formula (III-c) are, for example, linear, branched or cyclic hexyl, heptyl, octyl (e.g. capryl), nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetraicosyl, pentaicosyl, hexaicosyl, heptaicosyl, octaicosyl, nonaicosyl, triacontyl, hexenyl, heptenyl, octenyl, nonenyl, decenyl, dodecenyl, tetradecenyl, hexadecenyl, octadecenyl, octadecadienyl, octadecatrienyl, eicosenyl, eicosadienyl, eicosatetraenyl, docosenyl, docosahexaenyl, tetracosenyl, or mixtures thereof.

Examples of the hydroxy alkyl and hydroxy alkenyl groups $R_5$ in the one or more structure units of the formula (III-a) and/or the one or more structure units of the formula (III-b) and/or the one or more structure units of the formula (III-c) are, for example, hydroxy hexyl, hydroxy heptyl, hydroxy octyl, hydroxy nonyl, hydroxy decyl, hydroxy undecyl, hydroxy dodecyl, hydroxy docosyl, hydroxy hexenyl, hydroxy heptenyl, hydroxy octenyl, hydroxy nonenyl, hydroxy decenyl, hydroxy dodecenyl, hydroxy docosenyl, or mixtures thereof.

"Phenyl alkyl" (or "phenyl alkylene") or "phenyl alkenyl" (or "phenyl alkenylene") groups according to the present invention are groups that are bound via their respective alkyl (or alkylene) or alkenyl (or alkenylene) group to the rest of the molecule. In contrast thereto, "alkyl phenyl" (or "alkyl phenylene") or "alkenyl phenyl" (or "alkenyl phenylene") groups according to the present invention are groups that contain an alkyl or an alkenyl group but are bound via their respective phenyl (or phenylene) group to the rest of the molecule.

Examples of the phenyl alkyl and phenyl alkenyl groups $R_5$ in the one or more structure units of the formula (III-a) and/or the one or more structure units of the formula (III-b) and/or the one or more structure units of the formula (III-c) are, for example, phenyl hexyl, phenyl heptyl, phenyl octyl, phenyl nonyl, phenyl decyl, phenyl undecyl, phenyl dodecyl, phenyl hexenyl, phenyl heptenyl, phenyl octenyl, phenyl nonenyl, phenyl decenyl, phenyl dodecenyl, or mixtures thereof.

Examples of the alkyl phenyl and alkenyl phenyl groups $R_5$ in the one or more structure units of the formula (III-a) and/or the one or more structure units of the formula (III-b) and/or the one or more structure units of the formula (III-c) are, for example, hexyl phenyl, heptyl phenyl, octyl phenyl, nonyl phenyl, decyl phenyl, undecyl phenyl, dodecyl phenyl, hexenyl phenyl, heptenyl phenyl, octenyl phenyl, nonenyl phenyl, decenyl phenyl, dodecenyl phenyl, or mixtures thereof.

Terminal Group (IV):

Terminal group (IV) is preferably selected from structure (IV-a), where c+d+e may preferably be from 10 to 120.

c may preferably from 0 to 200, more preferably from 2 to 130 and even more preferably from 10 to 130.

d may preferably from 0 to 50, more preferably from 0 to 20 and even more preferably 0.

e may preferably be 0.

The $[C_2H_4—O]$, $[C_3H_6—O]$ and $[C_4H_8—O]$ groups of (IV-a) may be arranged blockwise, alternating, periodically and/or statistically, preferably blockwise and/or statistically, and either of the $[C_2H_4—O]$, $[C_3H_6—O]$ and $[C_4H_8—O]$ groups of the terminal group (IV-a) can be linked to $—R_7$ and/or —O.

Structure Unit (V):

f is, based on a molar average, a number from 2 to 500, preferably from 2 to 200, more preferably from 2 to 130 and even more preferably from 10 to 130.

The amounts of structural units (I), (II) and (IIIa-c), the terminal group (IV), and the polyalkyleneglycol derived structural unit (V), based on the total weight of the polymer, may preferably be least 50 wt.-%, more preferably at least 60 wt.-%, even more preferably at least 70 wt.-% and even more preferably at least 80 wt.-%.

The amount of terminal group (IV), based on the total weight of the polymer, may preferably be at least 40 wt. %, more preferably at least 50 wt.-%, even more preferably at least 60 wt.-% and most preferably at least 70 wt.-%.

The polymer may consist exclusively of structural units (I), (II) and (IIIa-c), the terminal group (IV), and the polyalkyleneglycol derived structural unit (V).

Typically, the polymer has a weight average molecular weight (Mw) is from 2000 to 20000 g/mol. The weight average molecular weight (Mw) of the polymer may be determined by GPC analysis, preferably as detailed in the following: 10 μl of sample is injected onto a PSS Suprema column of dimensions 300×8 mm with porosity 30 Å and particle size 10 μm. The detection is monitored at 235 nm on a multiple wavelength detector. The employed eluent is 1.25 g/l of disodium hydrogen phosphate in a 45/55% (v/v) water/acetonitrile mixture. Separations are conducted at a flow-rate of 0.8 ml/minute. Quantification is performed by externally calibrating standard samples of different molecular weight polyethylene glycols.

For the preparation of the polymers of the invention, typically a two-stage process is used of either direct esterification of diacids and diols or transesterification of diesters and diols, followed by a polycondensation reaction under reduced pressure. The inventive polymers have no obvious amine smell, and the process of synthesis is very easy to control.

It is to be understood that the polymers of the invention are typically prepared by polycondensation processes. This leads to statistically determined mixtures of polymers in which a mixture of molecular species with a distribution around a molar average is obtained. The following paragraphs will show illustrative, but by no means limiting, structural entities that can be found in the polymers of the invention.

The structure units of the formula (I) and optional additional di- or polycarboxylic acid-based structures are linked indirectly, preferably via the structure units of the formulae (II), (IIIa), (IIIb) or (IIIc), which—in the case of structure units of the formulae (I) and (II) or in the case of the structure units of the formulae (I) and (IIIa)—results in the following structural entities:

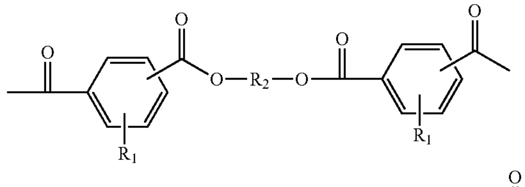

or

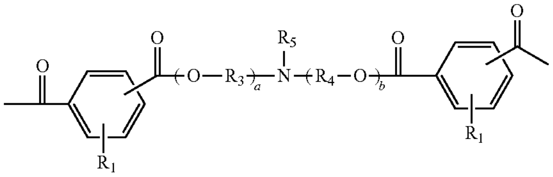

Preferably, the terminal group (IV) is linked to an acyl group derived from a dicarboxylic acid, preferably to the structure unit of the formula (I), which—in the case of structure unit of the formula (IV-a)—results in the following structural entity:

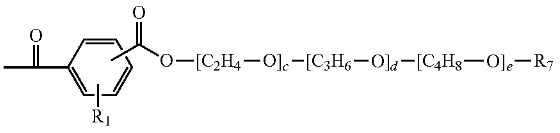

The polymers of the invention may be used in solid form, i.e. as granules, but may also be provided as solutions or dispersions. The latter two exhibit beneficial handling properties and are more easily dosed. Preferably, the solutions or dispersions comprise the polymers of the invention in an amount of from 25 to 70 weight-% based on the total mass of the solution or dispersion. Suitable solvents for such solutions or dispersions are for example: water, ethanol, propanol, butanol, ethylene glycol, 1,2-propylene glycol, 1,3-propylene glycol, 1,2-butylene glycol, 1,3 butylene glycol, 1,4-butylene glycol, butyl glycol, butyl diglycol and butyl polyglycol. These solvents are preferably used in an amount of from 25 to 75 wt.-% and more preferably in an amount of from 30 to 75 wt.-%, in each case based on the total weight of the solution or dispersion.

Other ingredients. The composition can further comprise at least one of a surfactant, an enzyme, an enzyme stabilizing system, a detergent builder, a chelating agent, a complexing agent, clay soil removal/anti-redeposition agents, polymeric soil release agents, polymeric dispersing agents, polymeric grease cleaning agents, a dye transfer inhibiting agent, a bleaching agent, a bleach activator, a bleaching catalyst, a fabric conditioner, a clay, a foam booster, an anti-foam, a suds suppressor, an anti-corrosion agent, a soil-suspending agent, a dye, a hueing dye, a bactericide, a tarnish inhibitor, an optical brightener, a perfume, a saturated or unsaturated fatty acid, a calcium cation, a magnesium cation, a visual signaling ingredient, a structurant, a thickener, an anti-caking agent, a starch, sand, a gelling agents, or any combination thereof.

Surfactant System: The composition may comprise a surfactant system in an amount sufficient to provide desired cleaning properties. In some embodiments, the cleaning composition comprises, by weight of the composition, from about 1% to about 70% of a surfactant system. In other embodiments, the liquid cleaning composition comprises, by weight of the composition, from about 2% to about 60% of the surfactant system. In further embodiments, the cleaning composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactant. Non-limiting examples of suitable anionic surfactants include any conventional anionic surfactant, such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates (AEC).

Suitable anionic surfactant also includes branched anionic surfactant. anionic branched surfactants selected from branched sulphate or branched sulphonate surfactants. Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of C11 to C14/C15 in length and comprise structural isomers that are all branched in the 2-alkyl position.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Nonionic surfactant. Suitable nonionic surfactants useful herein can comprise any conventional nonionic surfactant. These can include, for e.g., alkoxylated fatty alcohols and amine oxide surfactants. Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates wherein the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched MEA ($BAE_x$), wherein x is from 1 to 30; alkylpolysaccharides; specifically alkylpolyglycosides; Polyhydroxy fatty acid amides; and ether capped poly(oxyalkylated) alcohol surfactants. Suitable nonionic detersive surfactants also include alkyl polyglucoside and alkyl alkoxylated alcohol. Suitable nonionic surfactants also include those sold under the tradename Lutensol® from BASF.

Cationic Surfactant. The surfactant system may comprise a cationic surfactant. In some aspects, the surfactant system comprises from about 0% to about 7%, or from about 0.1% to about 5%, or from about 1% to about 4%, by weight of the surfactant system, of a cationic surfactant, e.g., as a co-surfactant. In some aspects, the compositions of the invention are substantially free of cationic surfactants and surfactants that become cationic below a pH of 7 or below a pH of 6. Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA). Suitable cationic detersive surfactants also include alkyl pyridinium compounds, alkyl quaternary ammonium compounds, alkyl quaternary phosphonium compounds, alkyl ternary sulphonium compounds, and mixtures thereof.

Zwitterionic Surfactant. Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N, N-dimethylamino-1-propane sulfonate where the alkyl group can be $C_8$ to $C_{18}$ and in certain embodiments from $C_{10}$ to $C_{14}$.

Amphoteric Surfactant. Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine. Suitable amphoteric surfactants also include sarcosinates, glycinates, taurinates, and mixtures thereof.

Enzymes. Preferably the composition comprises one or more enzymes. Preferred enzymes provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, galactanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase.

Proteases. Preferably the composition comprises one or more proteases. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), especially those derived from *Bacillus*, such as *Bacillus* sp., *B. lentus, B. alkalophilus, B. subtilis, B. amyloliquefaciens, B. pumilus, B. gibsonii*, and *B. akibaii* described in WO2004067737, WO2015091989, WO2015091990, WO2015024739, WO2015143360, U.S. Pat. No. 6,312,936 B1, U.S. Pat. Nos. 5,679,630, 4,760,025, DE102006022216A1, DE102006022224A1, WO2015089447, WO2015089441, WO2016066756, WO2016066757, WO2016069557, WO2016069563, WO2016069569.

(b) trypsin-type or chymotrypsin-type proteases, such as trypsin (e.g., of porcine or bovine origin), including the *Fusarium* protease described in WO 89/06270 and the chymotrypsin proteases derived from *Cellumonas* described in WO 05/052161 and WO 05/052146.

(c) metalloproteases, especially those derived from *Bacillus amyloliquefaciens* described in WO07/044993A2; from *Bacillus, Brevibacillus, Thermoactinomyces, Geobacillus, Paenibacillus, Lysinibacillus* or *Streptomyces* spp. Described in WO2014194032, WO2014194054 and WO2014194117; from *Kribella alluminosa* described in WO2015193488; and from *Streptomyces* and *Lysobacter* described in WO2016075078.

(d) Protease having at least 90% identity to the subtilase from *Bacillus* sp. TY145, NCIMB 40339, described in WO92/17577 (Novozymes A/S), including the variants of this *Bacillus* sp TY145 subtilase described in WO2015024739, and WO2016066757.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Dupont; those sold under the tradename Opticlean® and Optimase® by Solvay Enzymes; and those available from Henkel/Kemira, namely BLAP (sequence shown in FIG. 29 of U.S. Pat. No. 5,352,604), and KAP (*Bacillus alkalophilus* subtilisin with mutations A230V+S256G+S259N) from Kao.

Amylases. Preferably the composition may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) variants described in WO 94/02597, WO 94/18314, WO96/23874 and WO 97/43424, especially the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) variants described in U.S. Pat. No. 5,856,164 and WO99/23211, WO 96/23873, WO00/60060 and WO 06/002643, especially the variants with one or more substitutions in the following positions versus the AA560 enzyme listed as SEQ ID No. 12 in WO 06/002643:

26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with SEQ ID No. 4 in WO06/002643, the wild-type enzyme from *Bacillus* SP722, especially variants with deletions in the 183 and 184 positions and variants described in WO 00/60060, which is incorporated herein by reference.

(d) variants exhibiting at least 95% identity with the wild-type enzyme from *Bacillus* sp. 707 (SEQ ID NO:7 in U.S. Pat. No. 6,093,562), especially those comprising one or more of the following mutations M202, M208, S255, R172, and/or M261. Preferably said amylase comprises one or more of M202L, M202V, M202S, M202T, M202I, M202Q, M202W, S255N and/or R172Q. Particularly preferred are those comprising the M202L or M202T mutations.

(e) variants described in WO 09/149130, preferably those exhibiting at least 90% identity with SEQ ID NO: 1 or SEQ ID NO:2 in WO 09/149130, the wild-type enzyme from *Geobacillus stearothermophilus* or a truncated version thereof (0 variants exhibiting at least 89% identity with SEQ ID NO:1 in WO2016091688, especially those comprising deletions at positions $H_{183}$+G184 and additionally one or more mutations at positions 405, 421, 422 and/or 428.

(g) variants exhibiting at least 60% amino acid sequence identity with the "PcuAmyl α-amylase" from *Paenibacillus curdlanolyticus* YK9 (SEQ ID NO:3 in WO2014099523).

(h) variants exhibiting at least 60% amino acid sequence identity with the "CspAmy2 amylase" from *Cytophaga* sp. (SEQ ID NO:1 in WO2014164777).

(i) variants exhibiting at least 85% identity with AmyE from *Bacillus subtilis* (SEQ ID NO:1 in WO2009149271).

(j) Variants exhibiting at least 90% identity variant with the wild-type amylase from *Bacillus* sp. KSM-K38 with accession number AB051102.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, California) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

Lipases. Preferably the composition comprises one or more lipases, including "first cycle lipases" such as those described in U.S. Pat. No. 6,939,702 B1 and US PA 2009/0217464. Preferred lipases are first-wash lipases. The composition may comprise a first wash lipase.

First wash lipases includes a lipase which is a polypeptide having an amino acid sequence which: (a) has at least 90% identity with the wild-type lipase derived from *Humicola lanuginosa* strain DSM 4109; (b) compared to said wild-type lipase, comprises a substitution of an electrically neutral or negatively charged amino acid at the surface of the three-dimensional structure within 15A of E1 or Q249 with a positively charged amino acid; and (c) comprises a peptide addition at the C-terminal; and/or (d) comprises a peptide addition at the N-terminal and/or (e) meets the following limitations: i) comprises a negative amino acid in position E210 of said wild-type lipase; ii) comprises a negatively charged amino acid in the region corresponding to positions 90-101 of said wild-type lipase; and iii) comprises a neutral or negative amino acid at a position corresponding to N94 or said wild-type lipase and/or has a negative or neutral net electric charge in the region corresponding to positions 90-101 of said wild-type lipase.

Preferred are variants of the wild-type lipase from *Thermomyces lanuginosus* comprising one or more of the T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Preferred lipases would include those sold under the tradenames Lipex® and Lipolex® and Lipoclean®.

Cellulases. In one aspect, other enzymes include cellulases of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and 5,691,178. Suitable cellulases include the alkaline or neutral cellulases having colour care benefits. Commercially available cellulases include CELLUZYME®, CAREZYME® and CAREZYME PREMIUM (Novozymes A/S), CLAZINASE®, and PURADAX HA® (Genencor International Inc.), and KAC-500(B)® (Kao Corporation).

The bacterial cleaning cellulase may be a glycosyl hydrolase having enzymatic activity towards amorphous cellulose substrates, wherein the glycosyl hydrolase is selected from GH families 5, 7, 12, 16, 44 or 74. Suitable glycosyl hydrolases may also be selected from the group consisting of: GH family 44 glycosyl hydrolases from *Paenibacillus polyxyma* (wild-type) such as XYG1006 described in U.S. Pat. No. 7,361,736 or are variants thereof. GH family 12 glycosyl hydrolases from *Bacillus licheniformis* (wild-type) such as SEQ ID NO:1 described in U.S. Pat. No. 6,268,197 or are variants thereof; GH family 5 glycosyl hydrolases from *Bacillus agaradhaerens* (wild type) or variants thereof; GH family 5 glycosyl hydrolases from *Paenibacillus* (wild type) such as XYG1034 and XYG 1022 described in U.S. Pat. No. 6,630,340 or variants thereof; GH family 74 glycosyl hydrolases from *Jonesia* sp. (wild type) such as XYG1020 described in WO 2002/077242 or variants thereof; and GH family 74 glycosyl hydrolases from *Trichoderma Reesei* (wild type), such as the enzyme described in more detail in Sequence ID NO. 2 of U.S. Pat. No. 7,172,891, or variants thereof. Suitable bacterial cleaning cellulases are sold under the tradenames Celluclean® and Whitezyme® (Novozymes A/S, Bagsvaerd, Denmark).

In one aspect, the composition may comprise a fungal cleaning cellulase belonging to glycosyl hydrolase family 45 having a molecular weight of from 17 kDa to 30 kDa, for example the endoglucanases sold under the tradename Biotouch® NCD, DCC and DCL (AB Enzymes, Darmstadt, Germany).

Pectate Lyases. Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, California).

Nuclease enzyme. The composition may comprise a nuclease enzyme. The nuclease enzyme is an enzyme capable of cleaving the phosphodiester bonds between the nucleotide sub-units of nucleic acids. The nuclease enzyme herein is preferably a deoxyribonuclease or ribonuclease enzyme or a functional fragment thereof. By functional fragment or part is meant the portion of the nuclease enzyme that catalyzes the cleavage of phosphodiester linkages in the DNA backbone and so is a region of said nuclease protein that retains catalytic activity. Thus it includes truncated, but functional versions, of the enzyme and/or variants and/or derivatives and/or homologues whose functionality is maintained.

Preferably the nuclease enzyme is a deoxyribonuclease, preferably selected from any of the classes E.C. 3.1.21.x, where x=1, 2, 3, 4, 5, 6, 7, 8 or 9, E.C. 3.1.22.y where y=1, 2, 4 or 5, E.C. 3.1.30.z where z=1 or 2, E.C. 3.1.31.1 and mixtures thereof.

Mannanases. The composition may comprise an extracellular-polymer-degrading enzyme that includes a mannanase enzyme. The term “mannanase” means a polypeptide having mannan endo-1,4-beta-mannosidase activity (EC 3.2.1.78) from the glycoside hydrolase family 26 that catalyzes the hydrolysis of 1,4-3-D-mannosidic linkages in mannans, galactomannans and glucomannans. Alternative names of mannan endo-1,4-beta-mannosidase are 1,4-3-D-mannan mannanohydrolase; endo-1,4-3-mannanase; endo-β-1,4-mannase; β-mannanase B; 3-1,4-mannan 4-mannanohydrolase; endo-3-mannanase; and β-D-mannanase. For purposes of the present disclosure, mannanase activity may be determined using the Reducing End Assay as described in the experimental section of WO2015040159. Suitable examples from class EC 3.2.1.78 are described in WO2015040159, such as the mature polypeptide SEQ ID NO: 1 described therein.

Galactanases. The composition may comprise an extracellular polymer-degrading enzyme that includes an endo-beta-1,6-galactanase enzyme. The term “endo-beta-1,6-galactanase” or “a polypeptide having endo-beta-1,6-galactanase activity” means a endo-beta-1,6-galactanase activity (EC 3.2.1.164) from the glycoside hydrolase family 30 that catalyzes the hydrolytic cleavage of 1,6-3-D-galactooligosaccharides with a degree of polymerization (DP) higher than 3, and their acidic derivatives with 4-O-methylglucosyluronate or glucosyluronate groups at the non-reducing terminals. For purposes of the present disclosure, endo-beta-1,6-galactanase activity is determined according to the procedure described in WO 2015185689 in Assay I. Suitable examples from class EC 3.2.1.164 are described in WO 2015185689, such as the mature polypeptide SEQ ID NO: 2.

Enzyme Stabilizing System. The composition may optionally comprise from about 0.001% to about 10% by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builder. The composition may optionally comprise a builder or a builder system. Built cleaning compositions typically comprise at least about 1% builder, based on the total weight of the composition. Liquid cleaning compositions may comprise up to about 10% builder, and in some examples up to about 8% builder, of the total weight of the composition. Granular cleaning compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing cleaning compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O)\cdot ySiO_2\cdot zM'O$ wherein M is Na and/or K, M' is Ca and/or Mg; y/x is 0.5 to 2.0; and z/x is 0.005 to 1.0.

Alternatively, the composition may be substantially free of builder.

Chelating Agent. The composition may also comprise one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Carboxylate polymer. The composition may comprise one or more carboxylate polymers as polymeric dispersing agents, anti-redeposition agent, or as cleaning polymer. The carboxylate polymers may comprise at least one monomer selected from acrylic acid, maleic acid (or maleic anhydride), fumaric acid, itaconic acid, aconitic acid, mesaconic acid, citraconic acid, methylenemalonic acid, and any mixture thereof. In one aspect, suitable carboxylate polymers can include maleate/acrylate random copolymer or polyacrylate homopolymer.

In another aspect, the carboxylate polymers may further comprise other monomers. Suitable other monomers may include sulfonated monomers, such as 2-acrylamido-2-methylpropane sulfonic acid (AMPS), 2-(meth)acrylamido-2-methylpropane sulfonic acid, 4-styrenesulfonic acid, vinylsulfonic acid, 3-allyloxy, 2-hydroxy-1-propane sulfonic acid (HAPS), 2-sulfoethyl(meth)acrylic acid, 2-sulfopropyl(meth)acrylic acid, 3-sulfopropyl(meth)acrylic acid, and 4-sulfobutyl(meth)acrylic acid, and the salt thereof.

Suitable other monomers may also include hydrophobic modified monomers, such as alkyl acrylate, or monomer represented by formulas (I) and (II):

formula (I)

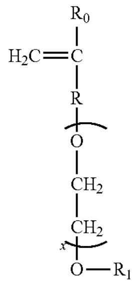

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

formula (II)

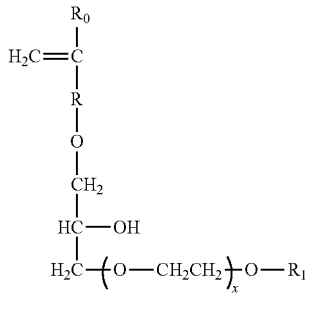

wherein in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

Soil release polymer. Suitable compositions can optionally comprise additional polymers, such as soil release polymers (also known as a polymeric soil release agents or "SRA"). Suitable soil release polymers typically have hydrophilic segments to hydrophilize the surface of hydrophobic fibers, such as polyester and nylon, and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures.

Soil release agents may include a variety of charged, e.g., anionic or cationic as well as non-charged monomer units. The structure of the soil release agent may be linear, branched, or star-shaped. The soil release polymer may include a capping moiety, which is especially effective in controlling the molecular weight of the polymer or altering the physical or surface-active properties of the polymer. The structure and charge distribution of the soil release polymer may be tailored for application to different fibers or textile types and for formulation in different detergent or detergent additive products.

One class of suitable soil release polymers include polyester comprising alkylene terephthalate unit and/or an alkylene isophthalate unit. Suitable soil release polymers may include, for example sulphonated and unsulphonated PET/POET polymers, both end-capped and non-end-capped. Examples of suitable polyester soil release polymers are the REPEL-O-TEX® line of polymers supplied by Rhodia, including REPEL-O-TEX® SRP6 and REPEL-O-TEX® SF-2. Other suitable soil release polymers include TexCare® polymers, including TexCare® SRA-100, TexCare® SRA-300, TexCare® SRN-100, TexCare® SRN-170, TexCare® SRN-240, TexCare® SRN-260, TexCare® SRN-300, and TexCare® SRN-325, all supplied by Clariant.

Other examples of suitable soil release polymers include graft copolymers of poly(vinyl ester), e.g., C1-C6 vinyl esters, preferably poly(vinyl acetate) grafted onto polyalkylene oxide backbones. Commercially available soil release agents of this kind include the SOKALAN type of material, e.g., SOKALAN HP-22, available from BASF (Germany). Another type of soil release agent may also include Sokalan® SR400 (copolymer of ((2-methacryloyloxy)ethyl)-trimethyl ammonium chloride) as described in WO201828933, WO201828934, WO201828935, WO201828936. Further suitable soil release polymers of a different type include the commercially available material ZELCON 5126 (from DuPont) and MILEASE T (from ICI), Sorez 100 (from ISP).

Amphiphilic cleaning polymer. The composition may comprise one or more amphiphilic cleaning polymers such as the compound having the following general structure: $bis(HOCH_2CH_2(OCH_2CH_2)_n)(CH_3)—N^+—C_xH_{2x}—N^+—(CH_3)bis((CH_2CH_2O)_nCH_2CH_2OH)$, wherein n=from 20 to 30, and x=from 3 to 8, or sulphated or sulphonated variants thereof.

The composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers comprise a core structure and a plurality of alkoxylate groups attached to that core structure. These may comprise alkoxylated polyalkylenimines, for example, having an inner polyethylene oxide block and an outer polypropylene oxide block.

Alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF.

The cleaning composition may comprise random graft polymers comprising a hydrophilic backbone comprising monomers, for example, unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof. A specific example of such graft polymers based on polyalkylene oxides and vinyl esters, in particular vinyl acetate. These polymers are typically prepared by polymerizing the vinyl ester in the presence of the polyalkylene oxide, the initiator used being dibenzoyl peroxide, dilauroyl peroxide or diacetyl peroxide.

The cleaning composition may comprise blocks of ethylene oxide, propylene oxide. Examples of such block polymers include ethylene oxide-propylene oxide-ethylene oxide (EO/PO/EO) triblock copolymer, wherein the copolymer comprises a first EO block, a second EO block and PO block wherein the first EO block and the second EO block are linked to the PO block. Blocks of ethylene oxide, propylene oxide, butylene oxide can also be arranged in other ways, such as (EO/PO) deblock copolymer, (PO/EO/PO) triblock copolymer. The block polymers may also contain additional butylene oxide (BO) block.

Cellulosic Polymer. The composition may comprise from about 0.1% to about 10%, by weight of the composition, of a cellulosic polymer.

Suitable cellulosic polymers include alkyl cellulose, alkylalkoxyalkyl cellulose, carboxyalkyl cellulose, and alkyl carboxyalkyl cellulose. In some aspects, the cellulosic polymer is selected from carboxymethyl cellulose, methyl cellulose, methyl hydroxyethyl cellulose, methyl carboxymethyl cellulose, or mixtures thereof. In certain aspects, the cellulosic polymer is a carboxymethyl cellulose having a degree of carboxymethyl substitution of from about 0.5 to about 0.9 and a molecular weight from about 100,000 Da to about 300,000 Da.

Carboxymethylcellulose polymers include Finnfix® GDA (sold by CP Kelko), a hydrophobically modified carboxymethylcellulose, e.g., the alkyl ketene dimer derivative of carboxymethylcellulose sold under the tradename Finnfix® SH1 (CP Kelko), or the blocky carboxymethylcellulose sold under the tradename Finnfix® V (sold by CP Kelko).

Suitable cellulosic polymers also include cellulose polymers with cationic modification and/or hydrophilic modifications. Suitable cationic modified cellulose polymers include UCARE JR125, UCARE JR400, UCARE JR30M, UCARE LR400, UCARE LR30M, SOFTCAT SL-5, SOFTCAT SL-30, SOFTCAT SL-60, SOFTCAT SL-100, SOFTCAT SX-400X, SOFTCAT SX-1300H, SOFTCAT SX-1300X, SOFTCAT SK-H, and SOFTCAT SK-MH, all of which are sold by The Dow Chemical.

Additional Amines: Additional amines may be used in the composition for added removal of grease and particulates from soiled materials. The compositions may comprise from about 0.1% to about 10%, in some examples, from about 0.1% to about 4%, and in other examples, from about 0.1% to about 2%, by weight of the cleaning composition, of additional amines. Non-limiting examples of additional amines may include, but are not limited to, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

Dye Transfer Inhibiting Agent. The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetri-acetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof or a combination thereof.

Bleaching Compounds, Bleaching Agents, Bleach Activators, and Bleach Catalysts. The compositions described herein may comprise bleaching agents, bleach activators and/or bleach catalysts. Bleaching ingredients may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the composition.

Examples of bleaching agents include oxygen bleach, perborate bleach, percarboxylic acid bleach and salts thereof, peroxygen bleach, persulfate bleach, percarbonate bleach, and mixtures thereof.

In some examples, compositions may also include a transition metal bleach catalyst.

Bleaching agents other than oxygen bleaching agents are also known in the art and can be utilized in composition. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the composition will typically comprise from about 0.025% to about 1.25%, by weight of the composition, of such bleaches, and in some examples, of sulfonate zinc phthalocyanine.

Brightener. Optical brighteners or other brightening or whitening agents may be incorporated at levels of from about 0.01% to about 1.2%, by weight of the composition.

Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium4,4'-bis{[4-anilino-6-(N-2-bis-hydroxyethyl)-s-triazine-2-yl]-amino}-2,2'-stilbenedisulonate (commercially available under the tradename Tinopal UNPA-GX by Ciba-Geigy Corporation), disodium 4,4'-bis{[4-anilino-6-(N-2-hydroxyethyl-N-methylamino)-s-triazine-2-yl}-amino]-2, 2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2, 2'-stilbenedisulfonate.

The brighteners may be added in particulate form or as a premix with a suitable solvent, for example nonionic surfactant, monoethanolamine, propane diol.

Fabric Hueing Agent. The composition may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Encapsulate. The composition may comprise an encapsulate. The encapsulate may comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

Other ingredients. The composition can further comprise silicates. Suitable silicates can include, for example, sodium silicates, sodium disilicate, sodium metasilicate, crystalline phyllosilicates or a combination thereof. In some embodiments, silicates can be present at a level of from about 1% to about 20% by weight, based on the total weight of the composition.

The composition can further comprise other conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes.

The composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic cellulose, cationic starch, cationic polyacylamides or a combination thereof. If present, the fatty acids and/or the deposition aids can each be present at 0.1% to 10% by weight, based on the total weight of the composition.

The composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

The composition can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein.

The pH of the composition (measured in aqueous solution at use concentration) can be neutral or alkaline (e.g., pH of about 7.0 to about 11.0), or can be acidic (e.g. pH of from 2.0 to less than 7.0). It maybe preferred that pH of the composition (measured in aqueous solution at use concentration) having a pH equal or lower than pKa of monomer (III-a-monomer) or (III-c monomer).

(III-a-monomer)

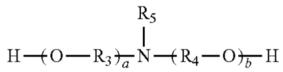

(III-c-monomer)

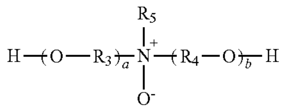

Without wishing to be bound by theory, it is believed that at such defined pH, polymer structure unit (III-a) and/or (III-c) can be partly protonated and exist in the form of (III-a-H) and/or (III-c-H). After being partly of fully protonated, polymer structure unit (III-a-H) and/or (III-c-H) can deliver cleaning and malodor benefit.

It maybe preferred that the pH of the composition (measured in aqueous solution at use concentration) has a pH below 9.5, more preferably below 8.5, more preferably below 7.5. It maybe preferred that the pH of the composition (measured in aqueous solution at use concentration) has a pH below 6.5, more preferably below 5.5, more preferably below 4.5.

(III-a-H)

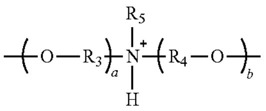

-continued (III-c-H)

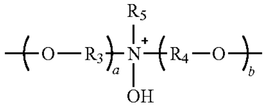

EXAMPLES

Example 1: Polymer Preparation

General Procedure for the Preparation of the Polymers of the Examples

The polymer synthesis is carried out by the reaction of dimethyl terephthalate (DMT), one or more alkylene glycols, one or more alkylamine ethoxylates and one or more alkyl capped polyalkylene glycols, using sodium acetate (NaOAc) and tetraisopropyl orthotitanate (IPT) as the catalyst system. The synthesis is a two-step procedure. The first step is a trans-esterification and the second step is a polycondensation. Subsequently the obtained polymer can be quaternised or N-oxidised.

Key to reactants used in the examples:

mPEG750 is mono hydroxyl-functional polyethylene glycol monomethyl ether, average molecular weight 750 Da (Polyglykol M 750, Clariant).

mPEG1000 is mono hydroxyl-functional polyethylene glycol monomethyl ether, average molecular weight 1 kDa (Polyglykol M 1000, Clariant).

mPEG2000 is mono hydroxyl-functional polyethylene glycol monomethyl ether, average molecular weight 2 kDa (Polyglykol M 2000, Clariant).

mPEG3000 is mono hydroxyl-functional polyethylene glycol monomethyl ether, average molecular weight 3 kDa (Polyglykol M 3000, Clariant).

mPEG4000 is mono hydroxyl-functional polyethylene glycol monomethyl ether, average molecular weight 4 kDa (Polyglykol M 4000, Clariant).

mPEG5000 is mono hydroxyl-functional polyethylene glycol monomethyl ether, average molecular weight 5 kDa (Polyglykol M 5000, Clariant).

NaCS is sodium cumene sulfonate

Na-DTPA is sodium salt of diethylenetriamine-pentaacetate

NaOAc is sodium acetate

NBDEA is N-butyldiethanolamine

NI 7EO is nonionic surfactant alkyl alkoxylates with on average 7 EO

NI 8EO is nonionic surfactant alkyl alkoxylates with on average 8 EO

NMDEA is N-methyldiethanolamine

PET is Polyethylene terephthalate

PG is 1,2-propylene glycol

DMT is dimethyl terephthalate

EO is $-CH_2CH_2O-$ or $-OCH_2CH_2-$

IPT is tetraisopropyl orthotitanate

NaOAc is sodium acetate

Genamin C 020 is 2,2'-($C_{12-18}$ even numbered alkyl imino) diethanol, Cocos fatty amine with 2 EO (Clariant)

Genamin C 050 is cocos fatty amine with 5 EO (Clariant)

Genamin C 100 is cocos fatty amine with 10 EO (Clariant)

Genamin C 200 is cocos fatty amine with 20 EO (Clariant)

Genamin CH 020 is 2,2'-(Cyclohexylimino)bisethanol (Clariant)

Genamin 3920 is capryl amine oxethylate with 2-4 EO (Clariant)

NBDEA is N-butyldiethanolamine

NMDEA is N-methyldiethanolamine

POET is polyoxyethylene terephthalate

Texcare® SRN 240 is a nonionic soil release polymer (Clariant)

Tinosan HP100 is 30 wt.-% 4.4'-dichloro 2-hydroxydiphenyl ether dissolved in 1,2-propylene glycol TSA is Tryptic Soy agar, purchased from Merck

Inventive Polymer Example 1

194 g (1 mol) of Dimethyl terephthalate (DMT), 143 g (1.88 mol) of 1,2-propylene glycol (PG), 71.2 g (0.25 mol) of Genamin C 020, 456 g (0.23 mol) of mPEG2000 and 1.25 g of sodium acetate (anhydrous) (NaOAc) are weighed into a reaction vessel at room temperature. For the melting process and homogenization, the mixture is heated up to 70° C. 1.65 mmol of tetraisopropyl orthotitanate (IPT) is added and the mixture is further heated up to 170° C. for 1 h and then up to 210° C. for a further 1 h sparged by a nitrogen stream. During the transesterification methanol is released from the reaction and is distilled out of the system (distillation temperature <55° C.). After 2 h at 210° C. nitrogen is switched off and the pressure is reduced to 400 mbar over 3 h. Subsequently, the mixture is heated up to 230° C. At 230° C., the pressure is reduced to 1 mbar over 160 min. Once the polycondensation reaction has started, 1,2-propylene glycol is distilled out of the system. The mixture is stirred for 4 h at 230° C. and a pressure of 1 mbar. The reaction mixture is cooled down to 140-150° C. Vacuum is released with nitrogen and the molten polymer is transferred out of the reactor.

Inventive Polymer Example 2

103.47 g of polymer example 1 was suspended in 126.1 mL of water at 60° C. To this suspension 10.4 µL (0.0146 mmol) diethylenetriaminepentaacetic acid (DTPA) and 0.2214 g NaHCO3 (2.6 mmol) were added. Now, 2.52 mL (29.3 mmol, 1.0 eq., based on the amine number of the polymer) H2O2 was added dropwise over a period of 30 minutes. The reaction was stirred for 6 hours at 60° C. Based on NMR-analysis additional 2.52 mL H2O2 were added dropwise and the reaction mixture was stirred for additional 7 hours at 80° C. After the addition of 0.2232 g NaHCO3 (2.6 mmol) and further 4 h at 80° C. the reaction mixture was cooled down and transferred out of the vessel.

Inventive Polymer Example 3

100.64 g of polymer example 1 was heated to 60° C. and 2.65 mL (0.028 mol, 0.98 eq. based on the amine number of the polymer) dimethylsulphate was added dropwise over a period of 10 minutes. The reaction mixture was heated to 80° C. and stirred for additional 6 hours. During this period 11.57 g of isopropanol was added to keep the reaction mixture stirrable. After a negative Preussmanntest the reaction mixture was cooled down and the quaternised polymer was transferred out of the vessel.

Inventive polymer example 4 to 16 are synthesized according to the general procedure as described above for inventive polymer example 1 with monomer type and dosage described below:

| Inventive polymers | DMT [g] | mPEG [molecular weight | mPEG [g] | PG [g] | Alkylamine ethoxylate type | Alkylamine ethoxylate [g] | IPT [μL] | NaOAc [g] |
|---|---|---|---|---|---|---|---|---|
| 4 | 97 | 2000 | 250 | 62 | Genamin 3920 | 19 | 200 | 0.50 |
| 5 | 97 | 2000 | 250 | 55 | Genamin 3920 | 38 | 200 | 0.50 |
| 6 | 97 | 2000 | 250 | 62 | Genamin CH 020 | 19 | 200 | 0.50 |
| 7 | 31 | 2000 | 72 | 23 | Genamin C 020 | 5 | 75 | 0.19 |
| 8 | 28 | 2000 | 65 | 20 | Genamin C 020 | 16 | 75 | 0.19 |
| 9 | 78 | 2000 | 182 | 53 | Genamin C 020 | 60 | 200 | 0.50 |
| 10 | 28 | 2000 | 66 | 21 | Genamin C 050 | 15 | 75 | 0.19 |
| 11 | 27 | 2000 | 62 | 19 | Genamin C 100 | 22 | 75 | 0.19 |
| 12 | 24 | 2000 | 56 | 17 | Genamin C 200 | 33 | 75 | 0.19 |
| 13 | 30 | 750 | 67 | 22 | Genamin C 020 | 11 | 75 | 0.19 |
| 14 | 30 | 1000 | 68 | 22 | Genamin C 020 | 11 | 75 | 0.19 |
| 15 | 29 | 3000 | 69 | 21 | Genamin C 020 | 11 | 75 | 0.19 |
| 16 | 29 | 4000 | 69 | 21 | Genamin C 020 | 11 | 75 | 0.19 |
| 17 | 29 | 5000 | 69 | 21 | Genamin C 020 | 11 | 75 | 0.19 |

Comparative polymer example 1 to 4 are synthesized according to the general procedure as described above for inventive polymer example 1 with monomer type and dosage described below:

| Comparative polymers | DMT [g] | mPEG [molecular weight] | mPEG [g] | PG [g] | Alkylamine ethoxylate type | Alkylamine ethoxylate [g] | IPT [μL] | NaOAc [g] |
|---|---|---|---|---|---|---|---|---|
| 1 | 31 | 2000 | 73 | 21 | NMDEA | 10 | 75 | 0.19 |
| 2 | 31 | 2000 | 73 | 21 | NBDEA | 13 | 75 | 0.19 |
| 3 | 31 | 2000 | 73 | 23 | NMDEA | 5 | 75 | 0.19 |
| 4 | 31 | 2000 | 73 | 23 | NBDEA | 7 | 75 | 0.19 |

Example 2: Polymer Smell

The polymer smell of several comparative and inventive polymer are summarized in table below:

TABLE 2

Polyester structures and odour

| | $R_5$ | p | q | Polyester odour |
|---|---|---|---|---|
| Comparative polyester 1 | Methyl | 5.9 | 1.5 | Strong amine smell |
| Comparative polyester 2 | n-butyl | 4.3 | 3.2 | amine smell |
| Comparative polyester 3 | Methyl | 7.0 | 0.6 | Strong amine smell |
| Comparative polyester 4 | n-butyl | 6.2 | 1.5 | amine smell |
| Inventive polyester 9 | cocoyl | 3.5 | 4.0 | No obvious amine smell |
| Inventive polyester 1 | cocoyl | 5.1 | 2.1 | No obvious amine smell |
| Inventive polyester 4 | n-octyl | 5.8 | 1.0 | No obvious amine smell |
| Inventive polyester 6 | Cyclohexyl | 5.6 | 1.3 | No obvious amine smell |

The inventive polymers have no obvious amine smell, and are suitable to use in detergent compositions as malodor control polymers. The comparative polymers exhibit an amine smell and are not suitable to use as malodor control polymers.

Example 3: Method of Evaluating Malodor and Freshness Benefit

Malodor and freshness of inventive and comparative composition are evaluated using method described below:

Step 1: 'Strip' Wash

The desired range of fabrics for test are sourced from commercial suppliers. On receipt they are 'strip' washed twice to remove finishes applied by the garment/fabric manufacturer. Typically, a detergent which does not contain soil release polymer is used. Some example detergent formulation does not contain soil release polymer can be found as comparative composition 1, comparative composition 3.

Step 2: Pre-Conditioning

After 'strip' washed, the test fabrics are then preconditioned for additional 4 cycles using inventive composition and comparative composition. If the weight of the test fabric is lower than standard load size of the washing machine, additional ballast may be added into washing machine and washed together with the test fabrics.

Step 3: Malodor Development

After pre-conditioning, standard size swatches (17.8 cm×17.8 cm) are cut from the preconditioned fabrics, and labelled, to provide 2 reps. The fabric swatches are then washed together with a series of malodor generation fabrics, including around 2.2 kg consumer dirty garment (sourced from consumer), 4 pieces WfK SBL 2004 sheets (sourced from Center for Testmaterials B.V.), 2 pieces 45 cm×45 cm CFT PC-S-33 Sebum/Carbon Black (sourced from Center for Testmaterials B.V.) sheets, 6 ml Technical (Artificial)

Body Soil (sourced from Lubrizol) applied on 10 cm×5 cm polycotton fabric. If the weight of the test fabric and malodor generation fabric is lower than standard load size of the washing machine, additional ballast may be added into washing machine and washed together with the test fabrics. The test swatches are then left to allow malodor to develop after wash for further panelist assessment.

The fabric swatches with different pre-conditioning are washed all together in a single washing machine, using a detergent which does not contain soil release polymer. After wash, the swatches are left overnight in the washing machine, then removed from the machine into individual glass jars, and stored for additional 3 days before panelist assessment.

Step 4: Malodor and Freshness Assessment.

The fabric swatches after malodor development is evaluated via a panel of 3 expert human graders, who grade each swatch for malodor intensity on a Monadic scale. The following 0-10 scales are used for malodor assessment. Malodor benefit is calculated using the malodor scale of reference minus malodor scale of test sample.

| Scale | Description |
|---|---|
| 0 | No malodor |
| 2 | I think there is malodor |
| 4 | There is definitely malodor |
| 6 | Strong malodor |
| 8 | Very strong malodor |
| 10 | Eye-watery strong malodor |

The freshness benefit is evaluated against a reference using the follow scales. For example, a "+5" means test sample has "clearly more freshness" against reference sample.

| Scale | Description |
|---|---|
| 0 | No freshness different |
| +2.5 | Slightly more freshness |
| +5 | Clearly more freshness |
| +7.5 | Very clearly more freshness |

Example 4. Malodor Benefit

Malodor Benefit of Inventive Polymer Versus No Polymer:

Inventive liquid detergent formulation containing inventive polymer example 1, 2, 3 and comparative liquid detergent formulation 1 are prepared by means know to those of ordinary skill in the art by mixing the listed ingredient.

| | Inventive composition 1 [wt. %] | Inventive composition 2, [wt. %] | Inventive composition 3, [wt. %] | Comparative composition 1 [wt. %] |
|---|---|---|---|---|
| LAS | 13.4 | 13.4 | 13.4 | 13.4 |
| AES | 9.7 | 9.7 | 9.7 | 9.7 |
| NI 7EO | 6.4 | 6.4 | 6.4 | 6.4 |
| Fatty Acid | 3.0 | 3.0 | 3.0 | 3.0 |
| Citric Acid | 3.7 | 3.7 | 3.7 | 3.7 |
| PEG-PVAc graft polymer [1] | 1.5 | 1.5 | 1.5 | 1.5 |
| Amphiphilic cleaning polymer [2] | 1.0 | 1.0 | 1.0 | 1.0 |
| Solvents | 12.0 | 12.0 | 12.0 | 12.0 |
| Inventive polymer 1 | 0.2 | | | |
| Inventive polymer 2 | | 0.2 | | |
| Inventive polymer 3 | | | 0.2 | |
| Enzymes [3] | 0.06 | 0.06 | 0.06 | 0.06 |
| Perfume | 1.4 | 1.4 | 1.4 | 1.4 |
| Water/minors | Balance | Balance | Balance | Balance |

[1] PEG-PVAc graft polymer is a polyvinyl acetate grafted polyethylene oxide copolymer having polyethylene oxide backbone and multiple polyvinyl acetate side chain.

[2] $bis(HOCH_2CH_2(OCH_2CH_2)_n)(CH_3)—N^+—C_xH_{2x}—N^+—(CH_3)bis((CH_2CH_2O)_nCH_2CH_2OH)$, wherein n = from 20 to 30, and x = from 3 to 8, or sulphated or sulphonated variants thereof.

[3] Including protease, mannanase, amylase, pectate lyases

The malodor and freshness of inventive composition 1-3 and comparative composition 1 were evaluated using the method. The malodor and freshness result are summarized in table below. Clear improvement on malodor and freshness can be observed from inventive polymers.

| | Fabric | Inventive composition 1 | Inventive composition 2 | Inventive composition 3 | Comparative composition 1 |
|---|---|---|---|---|---|
| Malodor benefit (comparative composition 1 as reference) | Cotton | +1.0s | +0.8s | 0 | reference |
| | Polycotton | +0.8s | +1.8s | +0.2 | reference |
| | Polyester | +0.5 | +0.3s | −0.2 | reference |
| Freshness versus comparative composition 1 | Cotton | 0 | 0 | −0.4 | reference |
| | Polycotton | +2.1s | +4.2s | +0.8s | reference |
| | Polyester | +1.7s | +2.1s | +1.7s | reference |

sstatistically significant

Malodor Benefit of Inventive Polymer Versus Comparative Polymer (Texcare SRN240)

Inventive liquid detergent formulation containing inventive polymer 1 and comparative liquid detergent formulations are prepared by means know to those of ordinary skill in the art by mixing the listed ingredient.

| | Inventive composition 4 [% wt] | Comparative composition 2 [wt. %] | Comparative composition 3 [wt. %] |
|---|---|---|---|
| LAS | 8.5 | 8.5 | 8.5 |
| AES | 5.3 | 5.3 | 5.3 |
| NI 7EO | 2.8 | 2.8 | 2.8 |
| NI 9EO | 1.5 | 1.5 | 1.5 |
| Fatty Acid | 2.9 | 2.9 | 2.9 |
| Citric Acid | 5.5 | 5.5 | 5.5 |
| PEG-PVAc graft polymer [1] | 1.1 | 1.1 | 1.1 |
| Amphiphilic cleaning polymer [2] | 0.6 | 0.6 | 0.6 |
| Solvents | 5.3 | 5.3 | 5.3 |
| Perfume | 1.4 | 1.4 | 1.4 |
| Enzyme System [3] | 0.1 | 0.1 | 0.1 |
| Inventive polymer 1 | 1.0 | 0 | 0 |
| SRN240 | 0 | 1.0 | 0 |
| Water/minors | Balance | balance | balance |

[1] PEG-PVAc graft polymer is a polyvinyl acetate grafted polyethylene oxide copolymer having polyethylene oxide backbone and multiple polyvinyl acetate side chain.

[2] $bis(HOCH_2CH_2(OCH_2CH_2)_n)(CH_3)—N^+—C_xH_{2x}—N^+—(CH_3)bis((CH_2CH_2O)_nCH_2CH_2OH)$, wherein n = from 20 to 30, and x = from 3 to 8, or sulphated or sulphonated variants thereof.

[3] Including protease, mannanase, amylase, pectate lyases

The malodor benefit of inventive composition 4 and comparative composition 2 and 3 were evaluated using the method. The malodor result are summarized in table below. Clear improvement on malodor can be observed from inventive polymers.

| | fabric | Inventive composition 4 | Comparative composition 2 | Comparative composition 3 |
|---|---|---|---|---|
| Malodor benefit (comparative composition 3 as reference) | Polycotton | +1.3 | 0 | reference |
| | polyester | +2.0s | +1.25 | reference |

sstatistically significant

Example 5: Method of Evaluating Cleaning

Inventive liquid detergent formulations (containing polymers of the invention) and comparative liquid detergent formulations (containing no polyester or an alternative additive) are prepared by means know to those of ordinary skill in the art by mixing the listed ingredients.

| | Detergent with inventive or comparative polymer [wt. %] | Detergent with no polymer [wt. %] |
|---|---|---|
| LAS | 13.4 | 13.4 |
| AES | 9.7 | 9.7 |
| NI 7EO | 6.4 | 6.4 |
| Fatty Acid | 3.0 | 3.0 |
| Citric Acid | 3.7 | 3.7 |

-continued

| | Detergent with inventive or comparative polymer [wt. %] | Detergent with no polymer [wt. %] |
|---|---|---|
| Enzymes | 0.06 | 0.06 |
| PEG-PVAc graft polymer [1] | 1.5 | 1.5 |
| Amphiphilic cleaning polymer [2] | 1.0 | 1.0 |
| Solvents | 12.0 | 12.0 |
| Inventive or comparative polymer | 1.0 | 0 |
| Perfume | 1.4 | 1.4 |
| Water/minors | Balance | Balance |

[1] PEG-PVAc graft polymer is a polyvinyl acetate grafted polyethylene oxide copolymer having polyethylene oxide backbone and multiple polyvinyl acetate side chain.

[2] $bis(HOCH_2CH_2(OCH_2CH_2)_n)(CH_3)—N^+—C_xH_{2x}—N^+—(CH_3)bis((CH_2CH_2O)_nCH_2CH_2OH)$, wherein n = from 20 to 30, and x = from 3 to 8, or sulphated or sulphonated variants thereof.

The detergent formulations were tested for their soil release performance according to the "Dirty-Motor Oil" Test (DMO-Test) using a Lini Apparatus under the following conditions.

| | |
|---|---|
| Equipment | Linitest Plus (SDL Atlas) |
| Water hardness | 14° dH |
| Washing temperature | 40° C. |
| Washing time | 30 min |
| Detergent concentration | 4 g/l liquid detergent |
| Soiled Fabric:Liquor Ratio | 1:40 |

As test fabric, white polyester standard swatches (WFK 30A from WFK Testgewebe GmbH) were used. The fabrics were prewashed three times with the liquid detergent compositions. The swatches were then rinsed, dried and soiled with 25 µl of dirty motor oil. After 1 hour the soiled fabrics were washed again with the same stored laundry detergent compositions used in the pre-washing step. After rinsing and drying the washed swatches, a measurement of the remission of the stained fabric at 457 nm was made using a spectrophotometer (Datacolor 650).

The soil release performance is shown as an improvement in soil removal of the swatches washed with a formulation containing an additive (such as the polymers of the invention) compared with the same formulation containing no soil release polymer):

$$\Delta R = R_{with\ additive} - R_{without\ additive}$$

Example 6: Cleaning Benefit of Inventive and Comparative Polymers

The washing results obtained for the laundry detergent compositions comprising the polymers of the invention are expressed as ΔR along with the standard deviations (SD).

| | Soil release test result | |
|---|---|---|
| Additive | ΔR | SD |
| Inventive example 1 | 14.6 | 0.9 |
| Inventive example 2 | 16.7 | 0.4 |
| Inventive example 3 | 15.6 | 0.4 |
| Inventive example 4 | 11.8 | 1.6 |
| Inventive example 5 | 22.2 | 1.6 |
| Inventive example 6 | 27.9 | 3.2 |

-continued

| | Soil release test result | |
|---|---|---|
| Additive | ΔR | SD |
| Inventive example 9 | 30.6 | 1.9 |
| Inventive example 10 | 16.8 | 4.0 |
| Inventive example 11 | 23.4 | 2.5 |
| Inventive example 12 | 18.5 | 3.2 |
| Inventive example 13 | 17.1 | 2.3 |
| Inventive example 15 | 15.7 | 2.5 |
| Inventive example 18 | 20.7 | 2.8 |

Soil release polymers typically have balanced hydrophilic segments and hydrophobic segments. In addition to the malodor benefit, the inventive polymers also show very good soil release efficacy versus no polymer reference.

Example 7: Method of Measure Bacteria Adhesion

Bacteria adhesion benefit of inventive and comparative composition are evaluated using method described below:

Step 1: Preparation

Detergent solutions for fabric pre-treatment are prepared by adding inventive or comparative polymer stock solution into 1000 ppm solution of base detergent in DI water. Solution of 1000 ppm base detergent and 5 ppm inventive or comparative polymer are used in this specific test.

Step 2: Pre-Treat of Fabrics 3 pieces of fabric (1 cm disks, polyester or cotton) are sterilised and placed into a 50 ml centrifuge tube using sterilised tweezers, then filled with 30 ml detergent solutions prepared above. After agitate the centrifuge for 20 mins at 40 RPM, the wash liquor was pour out and replaced with sterile DI water (deionized water) and rinse for 5 mins.

The same fabric disks are washed/rinsed follow the above process for another 3 times, each time using a freshly made detergent solution prepared follow step 1.

Step 3: Inoculation and Extraction of Bacteria

The treated fabric disks were placed in 12 well microtitre plate (one disk per individual well) and let dry for 1 hour. 20 ul of the $10^8$ cfu/ml bacterial suspension (such as *Klebsiella pneumonia, Staphylococcus aureus*) are added into each well that contains a fabric disk and incubate at 32° C. for 20 minutes.

Then the fabrics disks are washed and rinsed again once following the wash/rinse process described in Step 2, using a freshly made detergent solution prepared follow Step 1. After wash, each fabric disks are moved into labelled vials of neutraliser broth (9 ml) and vortex for 30 seconds at speed setting 7 to extract the bacteria into broth. This suspension is labeled as 1× diluted suspension.

Take 1 ml of each of above 1× diluted suspension and dilute with another 9 ml of neutralizer broth, the diluted suspension is labeled as 2× diluted suspension.

Take 1 ml of each of above 2× suspension and dilute with another 9 ml of neutralizer broth, the diluted suspension is labeled as 3× diluted suspension.

Pipette 100 μl of each 1×, 2×, 3× diluted suspension onto a 55 mm agar plate containing TSA (Tryptic Soy agar, purchased from Merck), thoroughly spread across the plate using a spreader. Incubate the plates overnight at 32°.

Count the number of colonies on each plate, recording "too many too count" (Tmtc) where the mass of bacterial cells have formed a continuous lawn.

Example 8. Bacteria Adhesion Test

Base detergent formulations below are prepared by means know to those of ordinary skill in the art by mixing the listed ingredients for the bacteria adhesion test.

| | [wt. %] |
|---|---|
| LAS | 10.2 |
| AES | 1.4 |
| NI 7E0 | 6.1 |
| $C_{12}$-$C_{14}$ alkyl dimethyl amine oxide | 0.5 |
| $C_{12}$-$C_{18}$ Fatty Acid | 2.5 |
| Citric acid | 1.2 |
| Ethanol | 1.7 |
| Sodium cumene sulfonate | 4.4 |
| Na-DTPA | 0.18 |
| Alkoxylated Polyethyleneimine [a] | 1.1 |
| Alkoxylated Polyethyleneimine [b] | 0.8 |
| Monoethanolamine | 1.3 |
| Tinosan HP100 | 0.05 |
| Calcium chloride | 0.03 |
| Perfume | 0.12 |
| Hydrogenated castor oil derivative structurant | 0.12 |
| Water/minors | balance |

[a] Polyethylenimine (MW = 600) with 20 ethoxylate groups per —NH on average.
[b] Polyethylenimine (MW = 600) with 24 ethoxylate groups and 16 propoxylate group per —NH on average.

The bacteria adhesion of inventive polymers and comparative polymer (SRN260) are tested according to the method of Example 7. The inventive polymers provide much better bacteria adhesion prevention benefit versus the comparative polymer.

| | Plate Count (*Klebsiella pneumoniae*) | | |
|---|---|---|---|
| Polymer | 1X | 2X | 3X |
| SRN260 | Tmtc | Tmtc | Tmtc |
| Inventive polymer 4 | Tmtc | 97 | 7 |
| Inventive polymer 6 | Tmtc | 146 | 17 |
| Inventive polymer 1 | Tmtc | 119 | 15 |
| Inventive polymer 9 | Tmtc | 139 | 24 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A detergent composition comprising a detersive surfactant and a water soluble polymer, wherein the water soluble polymer comprises:

(a) one or more of structure unit (I), (b) one or more of structure unit (II), (c) one or more of a structure unit selected from (III-a), (III-b), (III-c), or a combination thereof, wherein the structure units are:

(I)

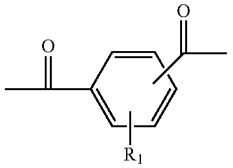

(II)

$$—O—R_2—O—$$

(III-a)

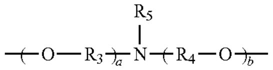

(III-b)

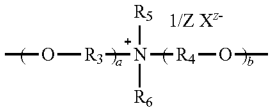

(III-c)

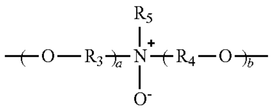

wherein:

$R_1$ is H or $SO_3M$, in which M is a counter ion;

$R_2$ is one or more linear or branched alkylene group represented by formula $(C_mH_{2m})$, with m being a number from about 2 to about 10;

$R_3$ and $R_4$ are independently selected from a linear or branched alkylene group represented by formula $(C_nH_{2n})$, with n being about 2, about 3 or about 4;

$R_5$ is selected from the group consisting of $—(C_jH_{2j}O)_k—R_{98}$, wherein k is, based on molar average, a number selected from about 0 to about 10, j is about 2, about 3 or about 4, $R_{98}$ is selected from alkyl, alkenyl, hydroxyalkyl, hydroxyalkenyl, alkyl phenyl, alkenyl phenyl, phenyl alkyl and phenyl alkenyl, wherein the alkyl and alkenyl groups comprise at least about 6 carbon atoms, $R_6$ is selected from the group consisting of $—(C_jH_{2j}O)_k—R_{99}$, wherein k is, based on molar average, a number selected from about 0 to about 10, j is about 2, about 3 or about 4, $R_{99}$ is selected from hydrogen, alkyl, alkenyl, hydroxyalkyl, hydroxyalkenyl, alkyl phenyl, alkenyl phenyl, phenyl alkyl and phenyl alkenyl, a and b are from about 1 to about 200, based on molar average and independently selected from one another.

2. A composition according to claim 1, wherein the water soluble polymer further comprises one or more of terminal group (IV) derived from polyalkylene glycolmonoalkylethers selected from structure (IV-a)

$$—O—[C_2H_4—O]_c—[C_3H_6—O]_d—[C_4H_8—O]_e—R_7 \quad \text{(IV-a)}$$

wherein:

$R_7$ is a linear or branched $C_{1-30}$ alkyl, preferably $C_{1-4}$ alkyl, more preferably methyl; and c, d and e are, based on molar average, a number independently selected from about 0 to about 200, where the sum of c+d+e is from about 2 to about 500, wherein the $[C_2H_4—O]$, $[C_3H_6—O]$ and $[C_4H_8—O]$ groups of the terminal group (IV-a) may be arranged blockwise, alternating, periodically, and/or statistically, either of the $[C_2H_4—O]$, $[C_3H_6—O]$ and $[C_4H_8—O]$ groups of the terminal group (IV-a) can be linked to $—R_7$ and/or —O.

3. A composition according to claim 2, where the water soluble polymer is characterized in that the amount of the one or more terminal groups (IV), based on the total weight of the water soluble polymer, is at least about 40 wt. %.

4. A composition according to claim 2 wherein the water soluble polymer further comprises a polyalkyleneglycol derived structure unit (V) comprising $$—O—[C_2H_4—O]_f— \quad \text{(V-a)}$$

wherein f is, based on a molar average, from about 2 to about 500.

5. A composition according to claim 4, wherein f is, based on molar average, from about 2 to about 200.

6. A composition according to claim 4, wherein f is, based on molar average, from about 2 to about 130.

7. A composition according to claim 4, wherein f is, based on molar average, from about 10 to about 130.

8. A composition according to claim 4, wherein the amounts of structural units (I); (II); at least one of (IIIa), (IIIb), and (IIIc); the terminal group (IV); and the polyalkyleneglycol derived structural unit (V), based on the total weight of the water soluble polymer, is at least about 50 wt. %.

9. A composition according to claim 4, wherein the water soluble polymer consists exclusively of structural units (I); (II); at least one of (IIIa), (IIIb), and (IIIc); the terminal group (IV); and the polyalkyleneglycol derived structural unit (V).

10. A composition according to claim 1, wherein $R_1$ is H.

11. A composition according to claim 1, wherein $R_2$ is selected from $(C_2H_4)$ and $(C_3H_6)$.

12. A composition according to claim 1, wherein $R_3$ and $R_4$ are $(C_2H_4)$, and a and b are both about 1.

13. A composition according to claim 1, wherein $R_5$ is selected from alkyl and alkenyl, wherein the alkyl and alkenyl groups comprise from about 6 to about 22 carbon atoms.

14. A composition according to claim 1, wherein $R_6$ selected from alkyl and alkenyl, wherein the alkyl and alkenyl groups comprise from about 1 to about 22 carbon atoms.

15. A composition according to claim 1, wherein the water soluble polymer is characterized in that its weight average molecular weight (Mw) is from about 2000 to about 20000 g/mol.

16. A method of using a composition according to claim 1 for treating a fabric surface.

17. Method of making composition according to claim 1, wherein the water soluble polymer is incorporated using a solution or dispersion comprising one or more polymers, wherein the solution or dispersion comprises from about 25 to about 70 wt.-% of the water soluble polymer, and one or more solvents selected from the group consisting of water, ethanol, propanol, butanol, ethylene glycol, 1,2-propylene glycol, 1,3-propylene glycol, 1,2-butylene glycol, 1,3 butylene glycol, 1,4-butylene glycol, butyl glycol, butyl diglycol butyl polyglycol, and combinations thereof.

18. The composition of claim 1, wherein $R_2$ is $(C_3H_6)$.

* * * * *